(12) United States Patent
Luft

(10) Patent No.: US 10,357,878 B2
(45) Date of Patent: Jul. 23, 2019

(54) METHOD FOR MOVING A MANIPULATOR AND APPARATUS HAVING A MANIPULATOR

(71) Applicant: Robert Bosch GmbH, Stuttgart (DE)

(72) Inventor: Michael Luft, Erbach (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 15/355,099

(22) Filed: Nov. 18, 2016

(65) Prior Publication Data

US 2017/0144303 A1 May 25, 2017

(30) Foreign Application Priority Data

Nov. 20, 2015 (DE) .................. 10 2015 222 942

(51) Int. Cl.
*G06F 19/00* (2018.01)
*B25J 9/16* (2006.01)
*B25J 11/00* (2006.01)

(52) U.S. Cl.
CPC ......... *B25J 9/1664* (2013.01); *B25J 11/0055* (2013.01); *G05B 2219/40395* (2013.01); *Y10S 901/02* (2013.01)

(58) Field of Classification Search
CPC ............... B25J 11/0055; B25J 9/1664; G05B 2219/40395; Y10S 901/02
See application file for complete search history.

(56) References Cited

U.S. PATENT DOCUMENTS

2014/0371905 A1* 12/2014 Eberst .................... B25J 9/1664
700/253
2017/0297323 A1* 10/2017 Yamazaki .............. B33Y 10/00
2018/0079043 A1* 3/2018 Inoue ..................... B23Q 15/00

FOREIGN PATENT DOCUMENTS

DE 10 2012 008 073 A1 10/2013
EP 0 368 088 A1 5/1990

OTHER PUBLICATIONS

German Search Report dated Sep. 27, 2016 (German language document) (8 pages).

* cited by examiner

*Primary Examiner* — Harry Y Oh
(74) *Attorney, Agent, or Firm* — Maginot, Moore & Beck LLP

(57) ABSTRACT

The disclosure relates to a method for moving a manipulator in space along a predefinable movement path with a plurality of individual movements to be carried out one after another in a predefined order, wherein, during the movement of the manipulator along the movement path, during and/or after each individual movement carried out, a reverse movement path is determined, along which, from an intermediate position which the manipulator has reached during and/or after the individual movement carried out last, the manipulator can traverse the individual movements previously carried out, backward in each case and in an order opposite to the predefined order, and to an apparatus having manipulator.

12 Claims, 2 Drawing Sheets

METHOD FOR MOVING A MANIPULATOR AND APPARATUS HAVING A MANIPULATOR

This application claims priority under 35 U.S.C. § 119 to application no. DE 10 2015 222 942.4, filed on Nov. 20, 2016 in Germany, the disclosure of which is incorporated herein by reference in its entirety.

BACKGROUND

The present disclosure relates to a method for moving a manipulator in space along a predefinable movement path and a computing unit and an apparatus having a manipulator for carrying out such a method.

Apparatuses having manipulators, such as CNC machines, jet cutting machines, winding machines, handling machines or industrial robots, for example, are used to carry out specific movement sequences with a tool. Here, specific actions can be carried out with the tool. For instance, in a jet cutting machine, sheet metal can be cut with a plasma jet, for example. Using a handling machine, for example, objects can be taken from a conveyor belt and moved to another position. In order to move the manipulator, as a rule a program is interpreted in which individual steps are stored in the sense of individual movements, in order to move the manipulator along a predefinable movement path.

SUMMARY

According to the disclosure, methods for moving a manipulator and a computing unit and an apparatus having a manipulator having the features of the disclosure are proposed. Advantageous refinements are the subject matter of particular embodiments and the following description.

A method according to the disclosure serves to move a manipulator in space along a predefinable movement path with a plurality of individual movements to be carried out one after another in a predefined order. Here, during the movement of the manipulator along the movement path, during and/or after each individual movement carried out, a reverse movement path is determined, along which, from an intermediate position which the manipulator has reached during and/or after the individual movement carried out last, the manipulator can traverse the individual movements previously carried out, backward in each case and in an order opposite to the predefined order. Thus, the reverse movement path is composed of commands for the converse travel over the individual movements previously traversed. These commands have a level of abstraction lying above binary data. This means in particular that the internally generated reverse movement path cannot be represented in binary data but by DIN 66025 commands In other words, in this way a level of abstraction at the level of DIN 66025 or ISO 6983 is made possible, i.e. the reverse path consists of ISO commands and not of internal complex binary data. This can thus involve commands according to the DIN 66025 standard.

In conventional methods for moving a manipulator, the movement path to be traversed, with the individual movements carried out and the operating parameters of the manipulator used in each case, can be stored in binary data. A reverse movement can certainly be carried out here by using the binary data but this binary data and therefore the reverse movement cannot be changed.

With the method proposed, however, as the predefinable movement path is traversed, a reverse movement path is always determined, so that from any arbitrary intermediate position which the manipulator has reached after an individual movement, the manipulator can be moved in accordance with the reverse movement path. No reconstruction of a reverse movement from binary data is therefore necessary. The manipulator can thus be stopped and moved back at any time if necessary, specifically also irrespective of possible other operating parameters of the manipulator. As compared with a conventional method, the complexity of software by means of which the method is implemented is also reduced considerably.

The reverse movement path is preferably determined in such a way (i.e. the commands are generated in such a way) that, when traversing the reverse movement path, one or more of the individual movements comprised by the reverse movement path can be changed and/or skipped. This permits very simple and also individual adaptation of the reverse movement path. Thus, for example in the case of a CNC machine, the individual movements of the reverse movement path can be changed to the effect that a tool, for example a milling head, is raised in order to cause no further damage to the workpiece during the reverse movement. Furthermore, for example, individual movements between two identical positions can also be skipped when traversing the reverse movement path. Therefore, a faster reverse movement is possible since, for example, loops can be avoided.

Advantageously, the reverse movement path is determined in such a way that, when traversing the reverse movement path, operating parameters of the manipulator can be changed as compared with the corresponding operating parameters during the predefinable movement path. For example, in this way a milling head or a plasma cutter of a CNC machine can be deactivated during the reverse movement, in order to move the manipulator to a desired earlier position more simply and without danger. By changing the speed during the movement of the manipulator, for example, reaching the desired position more quickly is possible.

It is advantageous if, during the determination of the reverse movement path for each individual movement comprised by the reverse movement path, the operating parameters of the manipulator used during the corresponding individual movement during the predefinable movement path are determined. It is therefore possible, as soon as a desired position is reached during the reverse movement, to immediately start traversing the predefinable movement path with the correct operating parameters, that is to say, for example, a suitable gas pressure in the case of a plasma cutter.

Preferably, when traversing the reverse movement path, during and/or after each individual movement carried out, a forward movement path is determined, along which, from a further intermediate position which the manipulator has reached during and/or after the individual movement carried out last while traversing the reverse movement path, the manipulator can traverse the individual movements previously carried out when traversing the reverse movement path, in each case backward and in the predefined order. Thus, the forward movement path is composed of commands for the converse travel over the individual movements of the reverse movement path that have previously been traversed. The individual movements of the forward movement path can therefore be traversed again in the direction in which they were also traversed during the predefinable movement path. In this way, it is possible to move the manipulator, after it is moved backward to a desired position, if desired also forward again as far as the previous intermediate position without having to traverse the regular movement path with the predefinable operating parameters. Together with the reverse movement path, this permits very fast and simple continuation of the actual movement path if it is necessary to move to a preceding position. That which was explained above for the commands of the reverse movement path applies to the commands of the forward movement path.

Advantageously, the forward movement path is determined in such a way that, when traversing the forward movement path, one or more of the individual movements comprised by the forward movement path can be changed and/or skipped. This permits very simple and also individual adaptation of the forward movement path. Thus, for example in the case of a CNC machine, the individual movements of the forward movement path can be changed to the effect that a tool, for example a milling head, is raised in order to cause no damage to the workpiece during the forward movement. Furthermore, for example, individual movements between two identical positions can also be skipped when traversing the forward movement path. Therefore, it is more quickly possible to reach the position at which the predefinable movement path was interrupted.

It is advantageous if the forward movement path is determined in such a way that, when traversing the forward movement path, operating parameters for the manipulator can be changed with respect to the corresponding operating parameters during the predefinable movement path. For example, in this way a milling head or a plasma cutter of a CNC machine can be deactivated during the forward movement, in order to move the manipulator to the original position more simply and without danger. By changing the speed during the movement of the manipulator, for example, reaching the original position more quickly is possible.

Preferably, when determining the forward movement path, for each individual movement comprised by the forward movement path, the operating parameters of the manipulator used during the corresponding individual movement in the predefinable movement path are determined. It is therefore possible, as soon as a desired position is reached during the forward movement, to immediately start traversing the predefinable movement path with the correct operating parameters, that is to say, for example, a suitable gas pressure in the case of a plasma cutter. Thus, for example, it is also possible to start with the predefinable movement path and machining even shortly before the original position.

Advantageously, as an apparatus comprising the manipulator, a lathe, a milling machine, a CNC machine, a jet cutting machine, for example a laser, plasma or water-jet cutting machine, a winding machine, for example for producing components from glass or carbon fibers, a handling machine or an industrial robot, for example for use in automobile construction, is used. These apparatuses are those apparatuses in which, as a rule, a program for moving the manipulator is processed. In particular, those apparatuses in which a machining operation has to be repeated after a fault in a certain area are of interest for the method.

A computing unit according to the disclosure, for example a control device of a CNC machine, is configured, in particular by programming, to carry out a method according to the disclosure.

In addition, the implementation of the method in the form of a computer program is advantageous, since this gives rise to particularly low costs, in particular when an executing control device is also used for further tasks and is therefore present in any case. Suitable data carriers for providing the computer program are in particular magnetic, optical and electric memories, such as hard drives, flash memories, EEPROMs, DVDs and many others. A download of a program via computer networks (internet, intranet and so on) is also possible.

An apparatus having manipulator according to the disclosure is configured to carry out a method according to the disclosure. In particular, the apparatus can have a computing unit according to the disclosure for this purpose.

Further advantages and refinements of the disclosure emerge from the description and the appended drawing.

It goes without saying that the features mentioned above and those still to be explained below can be used not only in the respectively specified combination but also in other combinations or on their own without departing from the scope of the present disclosure.

BRIEF DESCRIPTION OF THE DRAWINGS

The disclosure is illustrated schematically in the drawing by using an exemplary embodiment and will be described extensively below with reference to the drawing.

DETAILED DESCRIPTION

Figure 1A:
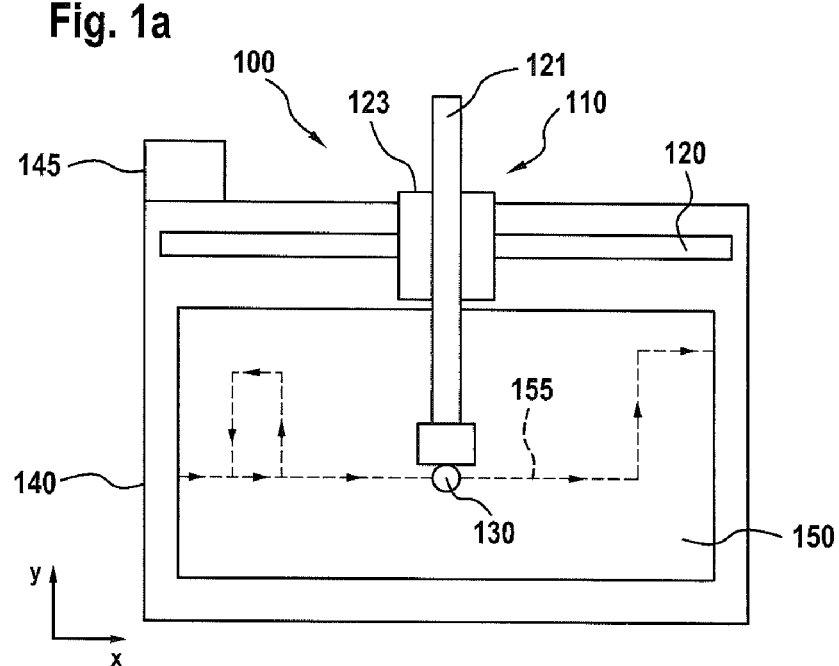
FIGS. 1a and 1b show, schematically, an apparatus having manipulator according to the disclosure in a preferred embodiment in plan view and side view.
Figure 1B:
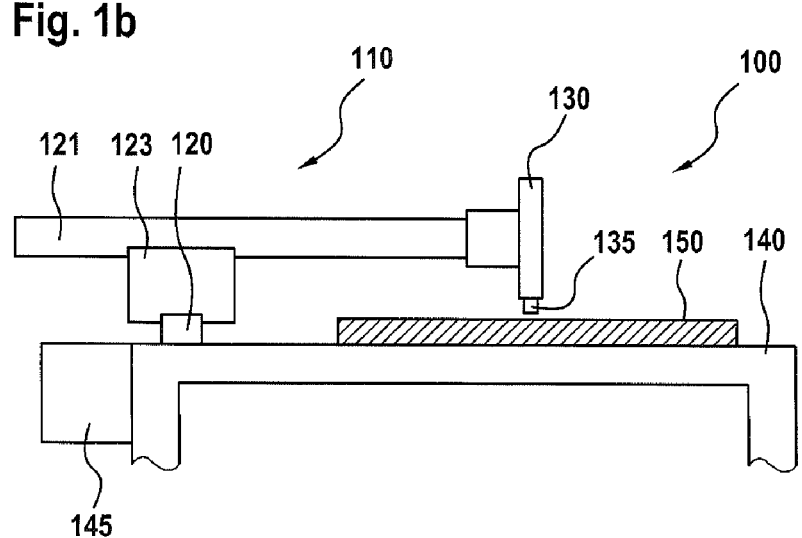

In FIGS. 1a and 1b, an apparatus 100 having manipulator 110 according to the disclosure in a preferred embodiment is illustrated schematically in plan view (FIG. 1a) and side view (FIG. 1b). The apparatus 100 is, by way of example, a CNC machine with plasma cutter. While the apparatus 100 comprises the entire structure, the manipulator 110 designates only the movable part of the apparatus.

The apparatus 100 has a table 140, on which the manipulator 110 is located. Here, the manipulator 110 has a first rail 120, along which a carriage 123 is arranged such that it can be moved. Arranged on the carriage 123 in turn is a second rail 121, which can be moved on the carriage 123 in a direction perpendicular to the second rail 120.

At the end of the second rail 121 that is directed toward the center of the table 140 there is arranged a cutting tool 130, which can be moved in a direction perpendicular to the surface of the table 140 and therefore perpendicular both to the first rail 120 and to the second rail 121. At the end facing the table 140, the cutting tool 130 has a nozzle 135 for a plasma jet. Feed lines to the plasma nozzle are not shown here for reasons of clarity. Also shown is a workpiece 150, which is arranged on the table 140 and which, for example, can be a metal plate which is to be cut along a predefined line 155 by means of the cutting tool 130.

In order then to machine, i.e. to cut, the workpiece 150 by means of the apparatus 100, the cutting tool 130 can be guided along the line 155 by means of the manipulator. In the present case, the movement path of the manipulator 110 that is to be carried out for this purpose is a two-dimensional movement path along the coordinates x and y. The apparatus 100 has a computing unit 145 for this purpose, for example a control unit, on which there is a suitable program, according to which the manipulator 110 can be moved appropriately and the cutting tool 130 can be operated appropriately.

Likewise, three-dimensional movement paths are also conceivable, for example in the case of a CNC mill, a handling machine or an industrial robot. In particular in handling machines or industrial robots, the movement paths can also comprise movements which are described by angles of robot arms.

Figure 2:
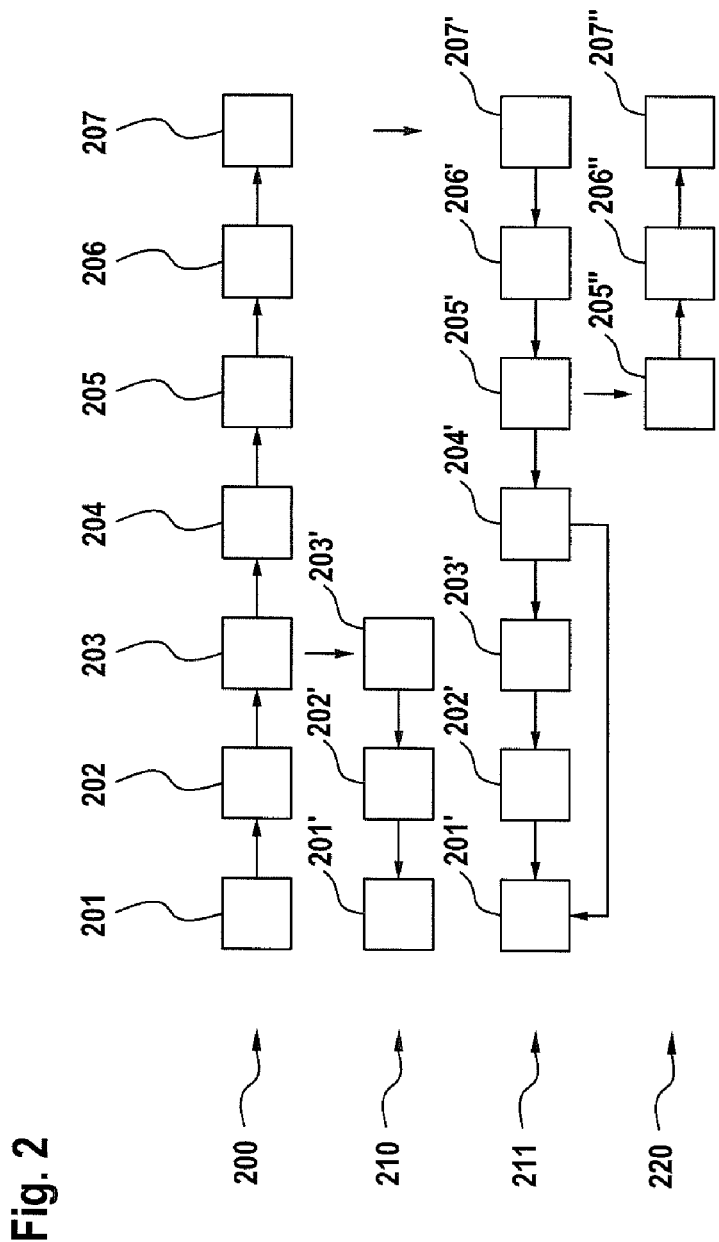
FIG. 2 shows, schematically, a sequence of a method according to the disclosure in a preferred embodiment.

In FIG. 2, a sequence of a method according to the disclosure is now illustrated schematically in a preferred embodiment. A predefinable movement sequence 200 comprises, by way of example, the individual movements 201 to 207, which are to be executed and to be traversed one after another in the order shown.

The movement path 200 can be predefined, for example by the line 155 shown in FIG. 1a. The individual movements 201 to 207 of the manipulator can be composed in such a way that first of all the rectangle shown on the left-hand side of the workpiece 150 shown in FIG. 1a is cut out and then the line 155 is followed as far as the right-hand side of the workpiece 150.

The movement path 200 can be predefined by means of a program, for example an NC program according to DIN 66025. The program can be processed by interpretation in the computing unit 145. For the individual movements 201 to 207, in particular there can be individual commands in the program. For the individual movements 201 to 207 and the movement path 200, additional specific operating parameters which, for example, predefine the driving of the cutting tool 130, can be provided.

During the movement of the manipulator and thus during the traversing of the movement path 200, for example following each individual movement, a reverse movement path is then determined, along which, from a respective intermediate position which the manipulator has reached after the individual movement carried out last, for example, the manipulator can traverse the individual movements previously carried out, backward in each case and in an order opposite to the predefined order. The reverse movement path can be processed by interpretation in the computing unit 145.

The reverse movement path 210 shows, for example, a reverse movement path which has been determined after the individual movement 203. Here, the reverse movement path 210 comprises the individual movements 201' to 203' which, beginning with the individual movement 203', can be traversed to the individual movements 201'. The reverse movement path is composed of individual commands for the converse travel over the individual movements of the movement path that have previously been traversed.

The individual movements of the reverse movement path 210 correspond to the individual movements of the movement path 200 but in the converse direction. If, for example, the individual movement 201 comprises a movement of 10 cm in the positive x direction, then the individual movement 201' comprises a movement of 10 cm in the negative x direction.

The reverse movement path 211 shows, for example, a reverse movement path which was determined after the individual movement 207. Here, the reverse movement path 211 comprises the individual movements 201' to 207' which, beginning with the individual movement 207', can be traversed to the individual movements 201'.

It is also shown that, when traversing the reverse movement path 211, although the individual movements 207' to 201' can be traversed one after another, for example the individual movements 203' and 202' can also be skipped. It is therefore also possible, for example, for a movement which, within the context of the predefinable movement path, is carried out between two identical positions, for example the cutting out of the rectangle according to the line 155 in FIG. 1a, to be skipped.

In this way, it is possible for unnecessary and/or undesired movements to be avoided when traversing the reverse movement path. Furthermore, provision can be made for the individual movements to be changed to the effect that the cutting tool 130 is raised during the reverse movement path. In this way, for example, damage to the workpiece can be avoided. This is particularly expedient, for example, in the case of a CNC mill, in which the milling head is raised.

Provision can also be made that, for each individual movement of the reverse movement path, the corresponding operating parameters of the predefinable movement path 200 are determined. Thus, for example, upon reaching a desired position, the cutting operation can be continued with the suitable operating parameters.

Also shown now is a forward movement path 220 which, by way of example, is determined iteratively after each individual movement when traversing the reverse movement path 211. The forward movement 220 for the instant shown comprises the individual movements 205" to 207". The forward movement path is composed of individual commands for the converse travel over the individual movements of the reverse movement path that have previously been traversed.

These individual movements can be carried out in the predefined order, as can the corresponding individual movements in the predefinable movement path 200. Likewise, the individual movements of the forward movement path 220 correspond with regard to their direction to the individual movements of the predefinable movement path 200.

As is also the case in the reverse movement path, one or more individual movements, for example, can be changed and/or skipped during the forward movement path. In addition, the operating parameters can be determined. The forward movement path can also be processed by interpretation in the computing unit 145. In the method proposed, a changeover between the predefinable movement path, i.e. normal operation, the reverse movement path and the forward movement path, is thus possible, for example also at any time.

What is claimed is:

1. A method for moving a manipulator in space along a predefinable movement path, the method comprising:
   operating the manipulator to carry out a plurality of individual movements one after another in a predefined order; and
   at least one of during and after each individual movement in the plurality of individual movements:
      determining a reverse movement path that is internally generated during the operating of the manipulator and that is composed of commands for converse travel over the individual movements previously traversed in the plurality of individual movements, along which, from an intermediate position that the manipulator has reached at least one of during and after the individual movement in the plurality of individual that was carried out last, the manipulator can traverse individual movements in the plurality of individual movements that have been previously carried out, backward in each case and in an order opposite to the predefined order, and such that, when traversing backward along the reverse movement path, at least one of the individual movements in the plurality of individual movements can be at least one of changed and skipped.

2. The method according to claim 1, the determining of the reverse movement path further comprising:
determining the reverse movement path such that, when traversing backward along the reverse movement path, operating parameters of the manipulator are changed as compared with the corresponding operating parameters used when traversing forward along the predefinable movement path.

3. The method according to claim 1, further comprising:
determining, during the determining of the reverse movement path, for each individual movement in the plurality of individual movements that forms the reverse movement path, operating parameters of the manipulator used during the corresponding individual movement in the plurality of individual movements when traversing forward along the predefined movement path.

4. The method according to claim 1, further comprising:
determining, when traversing backward along the reverse movement path, at least one of during and after each individual movement in the plurality of individual movements, a forward movement path, along which, from a further intermediate position that the manipulator has reached at least one of during and after the individual movement in the plurality of individual movements that was carried out last while traversing backwards along the reverse movement path, the manipulator can traverse the individual movements in the plurality of individual movements previously carried out while traversing backward along the reverse movement path, in each case forward and in the predefined order.

5. The method according to claim 4, the determining of the forward movement path further comprising:
determining the forward movement path such that, when traversing forward along the forward movement path, at least one of the individual movements in the plurality of individual movements can be at least one of changed and skipped.

6. The method according to claim 4, the determining of the forward movement path further comprising:
determining the forward movement path such that, when traversing forward along the forward movement path, operating parameters of the manipulator are changed as compared with the corresponding operating parameters used when traversing forward along the predefinable movement path.

7. The method according to claim 4, further comprising:
determining, during the determination of the forward movement path, for each individual movement in the plurality of individual movements that define the forward movement path, the operating parameters of the manipulator used during the corresponding individual movement in the plurality of individual movements when traversing forward along the predefinable movement path.

8. The method according to claim 1, further comprising:
using an apparatus comprising the manipulator, the apparatus being at least one of a lathe, a milling machine, a CNC machine, a jet cutting machine, a winding machine, a handling machine, and an industrial robot.

9. A computer for moving a manipulator in space along a predefinable movement path, the computing unit being configured to:
operate the manipulator to carry out a plurality of individual movements one after another in a predefined order; and
at least one of during and after each individual movement in the plurality of individual movements:
determine a reverse movement path that is internally generated during the operating of the manipulator and that is composed of commands for converse travel over the individual movements previously traversed in the plurality of individual movements, along which, from an intermediate position that the manipulator has reached at least one of during and after the individual movement in the plurality of individual that was carried out last, the manipulator can traverse individual movements in the plurality of individual movements that have been previously carried out, backward in each case and in an order opposite to the predefined order, and such that, when traversing backward along the reverse movement path, at least one of the individual movements in the plurality of individual movements can be at least one of changed and skipped.

10. The computer according to claim 9, wherein the computer is configured to execute a computer program.

11. The computer according to claim 9, wherein the computer program is stored on a non-transitory machine-readable storage medium.

12. An apparatus comprising:
a manipulator; and
a computer operably connected to operate the manipulator, the computer configured to:
operate the manipulator to carry out a plurality of individual movements one after another in a predefined order; and
at least one of during and after each individual movement in the plurality of individual movements:
determine a reverse movement path that is internally generated during the operating of the manipulator and that is composed of commands for converse travel over the individual movements previously traversed in the plurality of individual movements, along which, from an intermediate position that the manipulator has reached at least one of during and after the individual movement in the plurality of individual that was carried out last, the manipulator can traverse individual movements in the plurality of individual movements that have been previously carried out, backward in each case and in an order opposite to the predefined order, and such that, when traversing backward along the reverse movement path, at least one of the individual movements in the plurality of individual movements can be at least one of changed and skipped.

* * * * *